United States Patent
Griffin et al.

(10) Patent No.: US 11,416,221 B2
(45) Date of Patent: Aug. 16, 2022

(54) QUANTUM ENTANGLEMENT PROTECTION

(71) Applicant: Red Hat, Inc., Raleigh, NC (US)

(72) Inventors: Leigh Griffin, Waterford City (IE); Stephen Coady, Waterford City (IE)

(73) Assignee: Red Hat, Inc., Raleigh, NC (US)

(*) Notice: Subject to any disclaimer, the term of this patent is extended or adjusted under 35 U.S.C. 154(b) by 8 days.

(21) Appl. No.: 15/930,025

(22) Filed: May 12, 2020

(65) Prior Publication Data
US 2021/0357186 A1 Nov. 18, 2021

(51) Int. Cl.
*G06F 8/30* (2018.01)
*G06N 10/00* (2022.01)

(52) U.S. Cl.
CPC .......... *G06F 8/316* (2013.01); *G06N 10/00* (2019.01)

(58) Field of Classification Search
None
See application file for complete search history.

(56) References Cited

U.S. PATENT DOCUMENTS

| | | | |
|---|---|---|---|
| 7,451,292 B2 | 11/2008 | Routt | |
| 7,639,035 B2 | 12/2009 | Berkley | |
| 7,853,011 B2 | 12/2010 | Kuang et al. | |
| 8,102,185 B2 | 1/2012 | Johansson et al. | |
| 8,434,027 B2 | 4/2013 | Jones | |
| 8,600,051 B2 | 12/2013 | Noh | |
| 8,959,115 B2 | 2/2015 | Marathe | |
| 9,264,226 B2 | 2/2016 | Harrison et al. | |
| 9,495,644 B2 | 11/2016 | Chudak et al. | |
| 9,509,506 B2 | 11/2016 | Hughes et al. | |
| 9,774,401 B1 | 9/2017 | Borrill | |
| 9,847,913 B2 | 12/2017 | Kanda et al. | |
| 9,887,976 B2 | 2/2018 | Hughes et al. | |
| 10,331,658 B2 | 6/2019 | Pennefather et al. | |
| 10,592,216 B1 | 3/2020 | Richardson et al. | |
| 2003/0121028 A1 | 6/2003 | Coury et al. | |
| 2012/0093521 A1 | 4/2012 | Harrison et al. | |
| 2013/0107253 A1* | 5/2013 | Santori | G06N 10/00 356/301 |
| 2013/0308956 A1* | 11/2013 | Meyers | H04B 10/70 398/130 |

(Continued)

FOREIGN PATENT DOCUMENTS

| | | |
|---|---|---|
| CN | 105164704 B | 7/2018 |
| CN | 109816112 A | 5/2019 |

(Continued)

OTHER PUBLICATIONS

Notice of Allowance for U.S. Appl. No. 16/227,747, dated Jun. 10, 2021, 7 pages.

(Continued)

*Primary Examiner* — Philip Wang
(74) *Attorney, Agent, or Firm* — Dority & Manning, P.A.

(57) ABSTRACT

Quantum entanglement protection is disclosed. An entanglement checker receives, from a requestor, a request associated with a first qubit. In response to receiving the request, the entanglement checker accesses qubit entanglement information that identifies an entanglement status of the first qubit. The entanglement checker determines, based on the qubit entanglement information, the entanglement status of the first qubit, and sends a response to the requestor based on the entanglement status.

20 Claims, 5 Drawing Sheets

(56) References Cited

U.S. PATENT DOCUMENTS

| | | | | |
|---|---|---|---|---|
| 2014/0365843 | A1* | 12/2014 | Ashikhmin | ........ H03M 13/1148 |
| | | | | 714/758 |
| 2016/0071021 | A1 | 3/2016 | Raymond | |
| 2017/0351974 | A1 | 12/2017 | Rose et al. | |
| 2018/0091440 | A1 | 3/2018 | Dadashikelayeh et al. | |
| 2018/0144262 | A1 | 3/2018 | Roetteler et al. | |
| 2018/0365585 | A1* | 12/2018 | Smith | ................ G06F 9/3877 |
| 2019/0042971 | A1 | 2/2019 | Zou | |
| 2019/0179730 | A1* | 6/2019 | Geller | .............. G06F 11/3648 |
| 2020/0074346 | A1 | 3/2020 | Griffin et al. | |
| 2020/0125402 | A1* | 4/2020 | Griffin | ................ G06F 9/4881 |
| 2020/0184025 | A1* | 6/2020 | Horii | .................... G06N 10/00 |
| 2020/0184031 | A1* | 6/2020 | Horii | .................... G06N 10/00 |
| 2020/0201655 | A1* | 6/2020 | Griffin | ................ G06F 9/4494 |
| 2020/0227522 | A1* | 7/2020 | Leipold | .............. H01L 29/423 |
| 2020/0313063 | A1* | 10/2020 | Pollanen | ................. H01P 3/06 |
| 2020/0374211 | A1* | 11/2020 | Griffin | ................. H04L 45/745 |
| 2020/0387821 | A1* | 12/2020 | Griffin | .................. G06N 10/00 |
| 2021/0027188 | A1* | 1/2021 | Nickerson | ............. B82Y 10/00 |
| 2021/0036846 | A1* | 2/2021 | Grice | .................... H04L 9/0858 |
| 2021/0058243 | A1* | 2/2021 | Starodubtsev | ...... G06F 9/45558 |

FOREIGN PATENT DOCUMENTS

| | | |
|---|---|---|
| JP | 6465876 B2 | 2/2019 |
| WO | 2016206498 A1 | 12/2016 |
| WO | 2018111242 A1 | 6/2018 |

OTHER PUBLICATIONS

Barnum, H. et al., "Authentication of Quantum Messages," Proceedings of the 43rd Annual IEEE Symposium on Foundations of Computer Science, Nov. 2002, IEEE, 10 pages.

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" Wired, Mar. 15, 2017, https://www.wired.com/2017/03/quantum-computers-used-hard-drives-made-dna/, 10 pages.

Choi, C., "A Data Bus for Quantum Computers," IEEE Spectrum, Nov. 9, 2017, https://spectrum.ieee.org/tech-talk/computing/hardware/a-quantum-bus-for-quantum-computers, 3 pages.

Gühne, O., et al., "Entanglement detection," Physics Reports, vol. 474, No. 1, Feb. 27, 2009, 90 pages.

Lee, C., "New form of qubit control may yield longer computation times," Ars Technica, Jan. 26, 2018, Wired Media Group, 5 pages.

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.

Sillanpaa, M. et al., "Coherent quantum state storage and transfer between two phase qubits via a resonant cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.

Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.

Yang, C., et al., "Entanglement generation and quantum information transfer between spatiallY-separated qubits in different cavities," New Journal of Physics, vol. 15, Nov. 1, 2013, 19 pages.

Non-Final Office Action for U.S. Appl. No. 16/859,571, dated Oct. 28, 2021, 9 pages.

Cheng, S.T. et al., "Quantum Switching and Quantum Merge Sorting," IEEE Transactions on Circuits and Systems I: Regular Papers, vol. 53, Issue 2, Feb. 2006, IEEE, 10 pages.

Whitehouse, L., "Data deduplication methods: Block-level versus byte-leveldedupe," Nov. 24, 2008, https://www.techtarget.com/searchdatabackup/tip/Data-deduplication-methods-Block-level-versus-byte-level-dedupe, 2 pages.

Non-Final Office Action for U.S. Appl. No. 16/912,091, dated Jan. 27, 2022, 14 pages.

* cited by examiner

QUANTUM ENTANGLEMENT PROTECTION

BACKGROUND

Quantum computing utilizes qubits to perform quantum calculations. Qubits are finite resources. As quantum computing continues to increase in popularity and become more commonplace, an ability to coordinate access to qubits from multiple potential quantum applications will be desirable.

SUMMARY

The examples disclosed herein implement quantum entanglement protection. In particular, prior to accessing a qubit, a requestor makes a request to an entanglement checker. The entanglement checker accesses qubit entanglement information that identifies an entanglement status of the qubit. The entanglement checker sends a response to the requestor based on the entanglement status of the qubit.

In one example a method is provided. The method includes receiving, by an entanglement checker executing on a computing device comprising a processor device, from a requestor, a request associated with a first qubit. The method further includes, in response to receiving the request, accessing qubit entanglement information that identifies an entanglement status of the first qubit. The method further includes determining, based on the qubit entanglement information, the entanglement status of the first qubit, and sending a response to the requestor based on the entanglement status.

In another example a quantum computing system is provided. The quantum computing system includes a memory, and a processor device coupled to the memory. The processor device is to receive, by an entanglement checker, from a requestor, a request associated with a first qubit. The processor device is further to, in response to receiving the request, access qubit entanglement information that identifies an entanglement status of the first qubit. The processor device is further to determine, based on the qubit entanglement information, the entanglement status of the first qubit, and send a response to the requestor based on the entanglement status.

In another example a computer program product is provided. The computer program product is stored on a non-transitory computer-readable storage medium and includes instructions to cause a processor device to receive, by an entanglement checker executing on a quantum computing system, from a requestor, a request associated with a first qubit. The instructions further cause the processor device to, in response to receiving the request, access qubit entanglement information that identifies an entanglement status of the first qubit. The instructions further cause the processor device to determine, based on the qubit entanglement information, the entanglement status of the first qubit. The instructions further cause the processor device to send a response to the requestor based on the entanglement status.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, an ability to coordinate access to qubits from multiple potential quantum applications will be desirable. A qubit may be in an entangled state or an unentangled state. In an entangled state, an attempted access of the qubit, such as an attempt to read the qubit, may destroy the entangled state of the qubit. Accordingly, it may become desirable to, prior to accessing a qubit, ensure that the qubit is not in an entangled state.

The examples disclosed herein implement quantum entanglement protection. In particular, prior to accessing a qubit, a requestor makes a request to an entanglement checker. The entanglement checker accesses qubit entanglement information that identifies an entanglement status of the qubit. The entanglement checker sends a response to the requestor based on the entanglement status of the qubit. The response may indicate, for example, that the qubit is in an entangled state, and therefore should not be accessed. The response may indicate, for example, that the qubit is not in an entangled state, and therefore may accessed. The response may indicate, for example, that the qubit is to be put into an entangled state at a future point in time, and may be accessed up until the future point in time.

Figure 1:
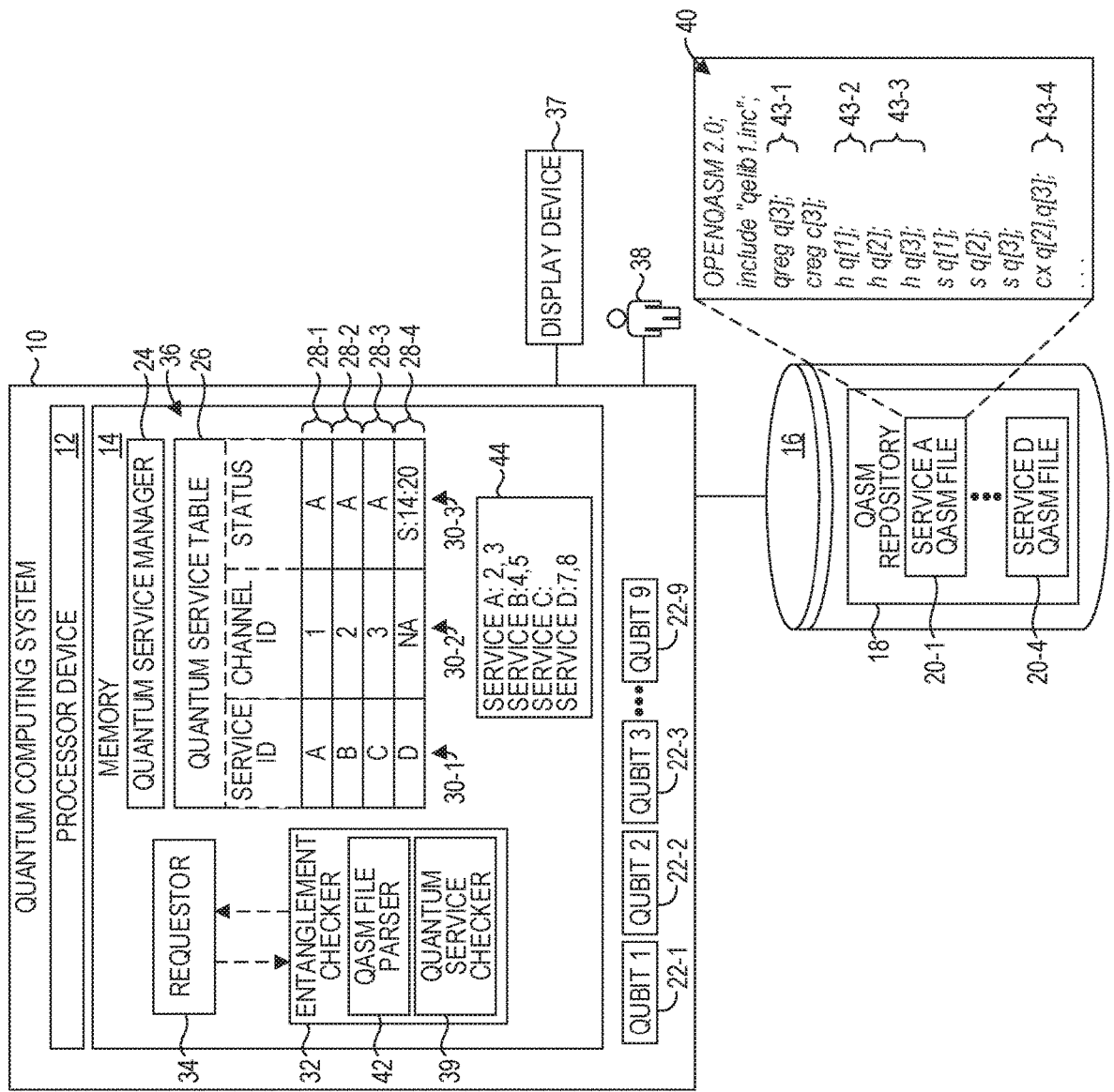
FIG. 1 is a block diagram of a quantum computing system in which examples may be practiced.

FIG. 1 is a block diagram of a quantum computing system 10 in which examples may be practiced. The quantum computing system 10 operates in a quantum environment but can operate using classical computing principles or quantum computing principles. When using quantum computing principles, the quantum computing system 10 performs computations that utilize quantum-mechanical phenomena, such as superposition and entanglement. The quantum computing system 10 may operate under certain environmental conditions, such as at or near 0° Kelvin. When using classical computing principles, the quantum computing system 10 utilizes binary digits that have a value of either 1 or 0.

The quantum computing system 10 includes one or more processor devices 12 and a memory 14. The quantum computing system 10 is communicatively coupled to a storage device 16 on which a quantum assembly (QASM) repository 18 is stored. The QASM repository 18 includes a plurality of QASM files 20-1-20-4, discussed in greater detail below.

The quantum computing system 10 implements a plurality of qubits 22-1-22-9. The quantum computing system 10 is capable of initiating a plurality of different quantum services. The term "quantum service" as used herein refers to a quantum application that accesses one or more of the qubits 22-1-22-9 and provides some desired functionality. Each quantum service is implemented via a corresponding QASM file 20-1-20-4, each of which comprises quantum computing instructions. In this example, the QASM file 20-1 corresponds to a quantum service A; the QASM file 20-2 corresponds to a quantum service B; the QASM file 20-3 corresponds to a quantum service C; and the QASM file 20-4 corresponds to a quantum service D. This correspondence information may be stored and accessible to components of the quantum computing system 10.

In some implementations, a quantum service manager 24 maintains a quantum service table 26 that includes information that describes a current state of certain quantum services. In this example, the quantum service table 26 includes a plurality of rows 28-1-28-4 (generally, rows 28), each of which corresponds to a particular quantum service.

Each row 28 contains three data fields 30-1-30-3. The data field 30-1 identifies the particular quantum service that is associated with that row 28. The data field 30-2 identifies a particular quantum channel utilized by the quantum service that is associated with that row 28. The data field 30-3 identifies a current status of the quantum service associated with that row 28. At the point in time illustrated in FIG. 1, the row 28-1 corresponds to the quantum service A, implemented by the QASM file 20-1. The data field 30-1 of the row 28-1 indicates that the row 28-1 corresponds to the quantum service A. The data field 30-2 of the row 28-1 indicates that the quantum service A utilizes channel 1. The data field 30-3 of the row 28-1 indicates that the quantum service A is currently active (i.e., currently executing). The row 28-2 corresponds to the quantum service B, implemented by the QASM file 20-2. The data field 30-1 of the row 28-2 indicates that the row 28-2 corresponds to the quantum service B. The data field 30-2 of the row 28-2 indicates that the quantum service B utilizes channel 2. The data field 30-3 of the row 28-2 indicates that the quantum service B is currently active (i.e., currently executing).

The row 28-3 corresponds to the quantum service C, implemented by the QASM file 20-3. The data field 30-1 of the row 28-3 indicates that the row 28-3 corresponds to the quantum service C. The data field 30-2 of the row 28-3 indicates that the quantum service C utilizes channel 3. The data field 30-3 of the row 28-3 indicates that the quantum service C is currently active (i.e., currently executing). The row 28-4 corresponds to the quantum service D, implemented by the QASM file 20-4. The data field 30-1 of the row 28-4 indicates that the row 28-4 corresponds to the quantum service D. The data field 30-2 of the row 28-4 indicates that the quantum service D is not using a channel. The data field 30-3 of the row 28-3 indicates that the quantum service A is currently inactive (i.e., currently not executing), but is scheduled to be initiated at a future point in time, in particular, at 2:20 PM.

The quantum computing system 10 includes an entanglement checker 32 that operates, upon request, to determine whether one or more of the qubits 22 are in an entangled state. To illustrate functionality of the entanglement checker 32, assume that a requestor 34 makes a request associated with the qubit 22-2. The requestor 34 may be a classical application that desires simply to determine the entanglement status of the qubit 22-2, or may be a quantum application that desires to access the qubit 22-2. In one example, the requestor 34 may comprise an operations administration tool that gathers information about the qubits 22, formats the information into a visually intuitive format, and presents the information on a display device 37 to a user, such as an operator 38. In another example, the requestor 34 may comprise an operating system component that is automatically invoked by any quantum application prior to accessing a qubit 22, and which communicates with the entanglement checker 32 to ensure that the qubit 22 is not in an entangled state prior to allowing the quantum application to access the qubit 22. In yet other examples, the quantum computing system 10 may have a protocol that requires any application, prior to accessing any qubit 22, to first determine, via the entanglement checker 32, that the qubit 22 is not in an entangled state.

It is noted that, because the entanglement checker 32 is a component of the quantum computing system 10, functionality implemented by the entanglement checker 32 may be attributed to the quantum computing system 10 generally. Moreover, in examples where the entanglement checker 32 comprises software instructions that program the processor device 12 to carry out functionality discussed herein, functionality implemented by the entanglement checker 32 may be attributed herein to the processor device 12.

Assume that the request received by the entanglement checker 32 is associated with the qubit 22-2. The entanglement checker 32 accesses qubit entanglement information 36 in response to receiving the request. In this example, the qubit entanglement information 36 includes the quantum service table 26. The entanglement checker 32 may access the quantum service table 26 directly, or may access the quantum service table 26 through an intermediary, such as the quantum service manager 24. In some implementations, a quantum service checker component 39 of the entanglement checker 32 may implement the functionality described herein regarding accessing the qubit entanglement information 36.

The entanglement checker 32 determines if a quantum service that utilizes the qubit 22-2, and that places the qubit 22-2 in an entangled state, is active (i.e., is currently executing), or is not active. Mechanisms for determining which quantum services utilize which qubits 22-1-22-9 will be discussed in greater detail below.

In this example, assume that the quantum service A utilizes the qubit 22-2. The entanglement checker 32 determines, via the information maintained in the row 28-1 of the quantum service table 26, that the quantum service A is active (i.e., executing). The entanglement checker 32 then sends a response to the requestor 34 indicating that the qubit 22-2 is in the entangled state, and thus is not available for access.

In some implementations, the entanglement checker 32, prior to accessing the quantum service table 26, accesses the QASM files 20-1-20-4 to determine which quantum services utilize the qubit 22-2. The entanglement checker 32 parses the respective QASM files 20 in accordance with a QASM programming language syntax. The entanglement checker 32 identifies programming instructions that, when executed, cause a qubit 22-1-22-9 to enter the entangled state. The entanglement checker 32 accesses correspondence information (not illustrated) that identifies the correspondence between the QASM files 20 and the quantum services A-D.

As an example, the entanglement checker 32 may access the QASM file 20-1, which corresponds to the quantum service A. As an example, the entanglement checker 32 accesses the QASM file 20-1 which includes a plurality of quantum instructions 40 in a quantum programming language. The entanglement checker 32 reads the quantum instructions 40, parses the quantum instructions 40 in accordance with syntax of the respective programming language, and analyzes the quantum instructions 40. In some implementations, the parsing function described herein may be implemented in a QASM file parser 42 component of the entanglement checker 32. Based on a "qreg q[3]" instruction 43-1, the entanglement checker 32 makes a determination that the quantum service A uses three qubits 22. Based on a "h q[1]" instruction 43-2, which utilizes the Hadamard gate, the entanglement checker 32 makes a determination that the qubit 22-1 is being placed into a state of superposition. Similarly, based on instructions 43-3, the entanglement checker 32 makes a determination that the qubits 22-2, 22-3 are also being placed into a state of superposition. Based on a "cx q[2],q[3]" instruction 43-4, which utilizes the cnot gate, the entanglement checker 32 makes a determination that the qubits 22-2 and 22-3 are placed into an entangled state.

The entanglement checker 32 thus determines that the quantum service A, if executing, places the qubit 22-1 in the entangled state. In some implementations, the entanglement checker 32 may store the results of the analysis of the QASM file 20-1 in a quantum service metadata table 44, which identifies, for each quantum service, those qubits 22 that the respective quantum service causes to be put into entangled states. In this manner, the entanglement checker 32 may only need to parse each QASM file 20 once, and subsequent requests received by the entanglement checker 32 may be processed by simply accessing the quantum service metadata table 44 to determine which quantum services can place which qubits 22 into the entangled state.

The entanglement checker 32, after processing the QASM files 20-1-20-4, determines that only quantum service A causes the qubit 22-2 to be put into the entangled state. The entanglement checker 32 can then access the qubit entanglement information 36, in this example, the quantum service table 26, to determine the current status of the quantum service A, and respond appropriately to the request received from the requestor 34.

As another example, assume that the requestor 34 makes a request associated with the qubit 22-9. The entanglement checker 32 may first access the quantum service metadata table 44 to determine if any quantum service may cause the qubit 22-9 to enter the entangled state. In this implementation, the QASM file 20-4 has been previously accessed, parsed and analyzed by the QASM file parser 42, and an entry has been made in the quantum service metadata table 44 indicating that the quantum service D causes the qubit 22-9 to enter the entangled state. The quantum service checker 32 accesses the qubit entanglement information 36, in this example the quantum service table 26, and determines, based on the row 28-4, that the quantum service D is not currently active (i.e., not executing), but is scheduled to execute at 2:20 PM. The entanglement checker 32 sends a response to the requestor 34 indicating that the qubit 22-9 is available for access until 2:20 PM.

Figure 2:
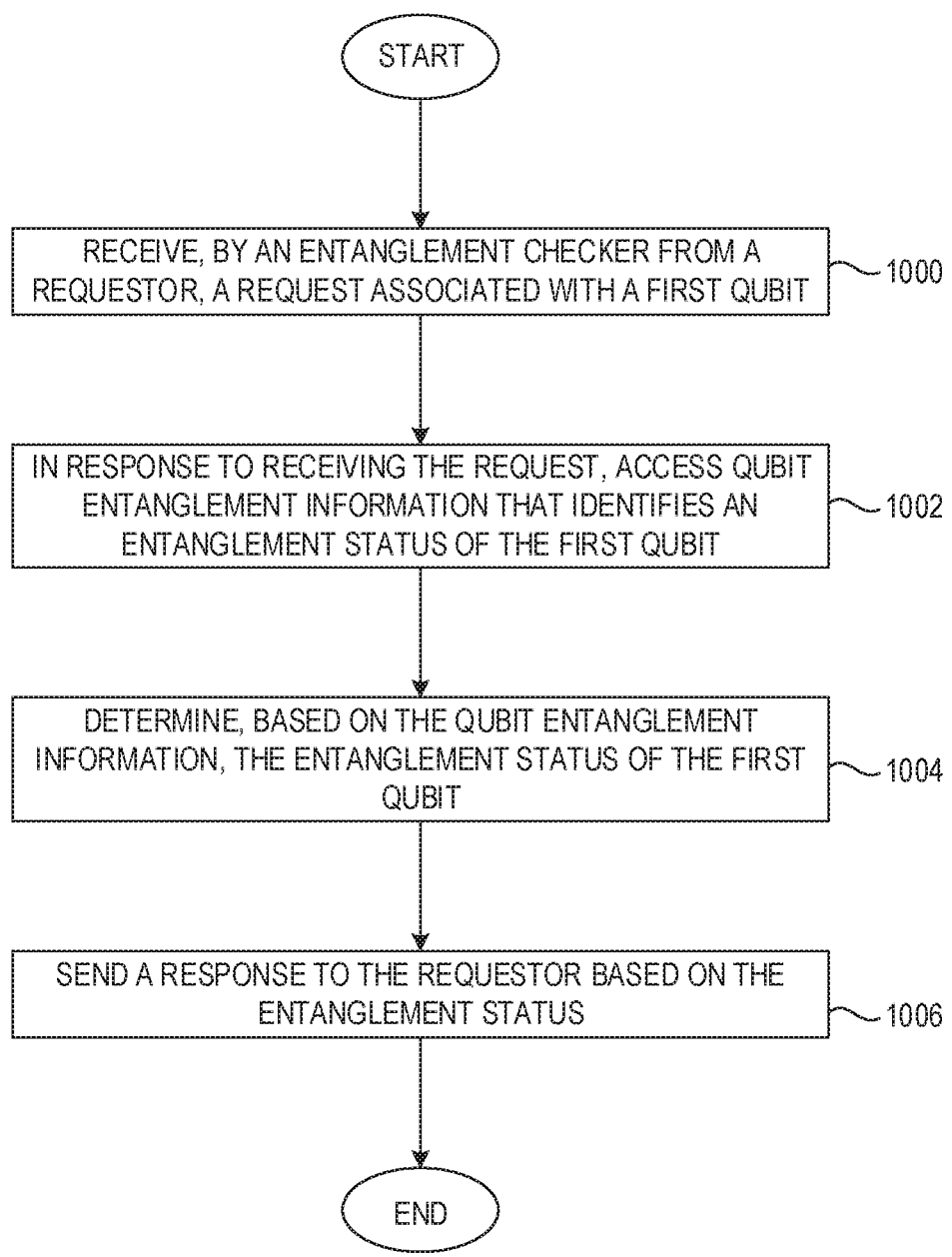
FIG. 2 is a flowchart of a method for quantum entanglement protection according to one example.

FIG. 2 is a flowchart of a method for quantum entanglement protection according to one example. FIG. 2 will be discussed in conjunction with FIG. 1. The entanglement checker 32 receives, from the requestor 34, a request associated with the qubit 22-1 (FIG. 2, block 1000). In response to receiving the request, the entanglement checker 32 accesses the qubit entanglement information 36, in this example the quantum service table 26, that identifies an entanglement status of the qubit 22-1 (FIG. 2, block 1002). The entanglement checker 32 determines, based on the qubit entanglement information 36, the entanglement status of the qubit 22-1 (FIG. 2, block 1004). The entanglement checker 32 sends a response to the requestor 34 based on the entanglement status (FIG. 2, block 1006).

Figure 3:
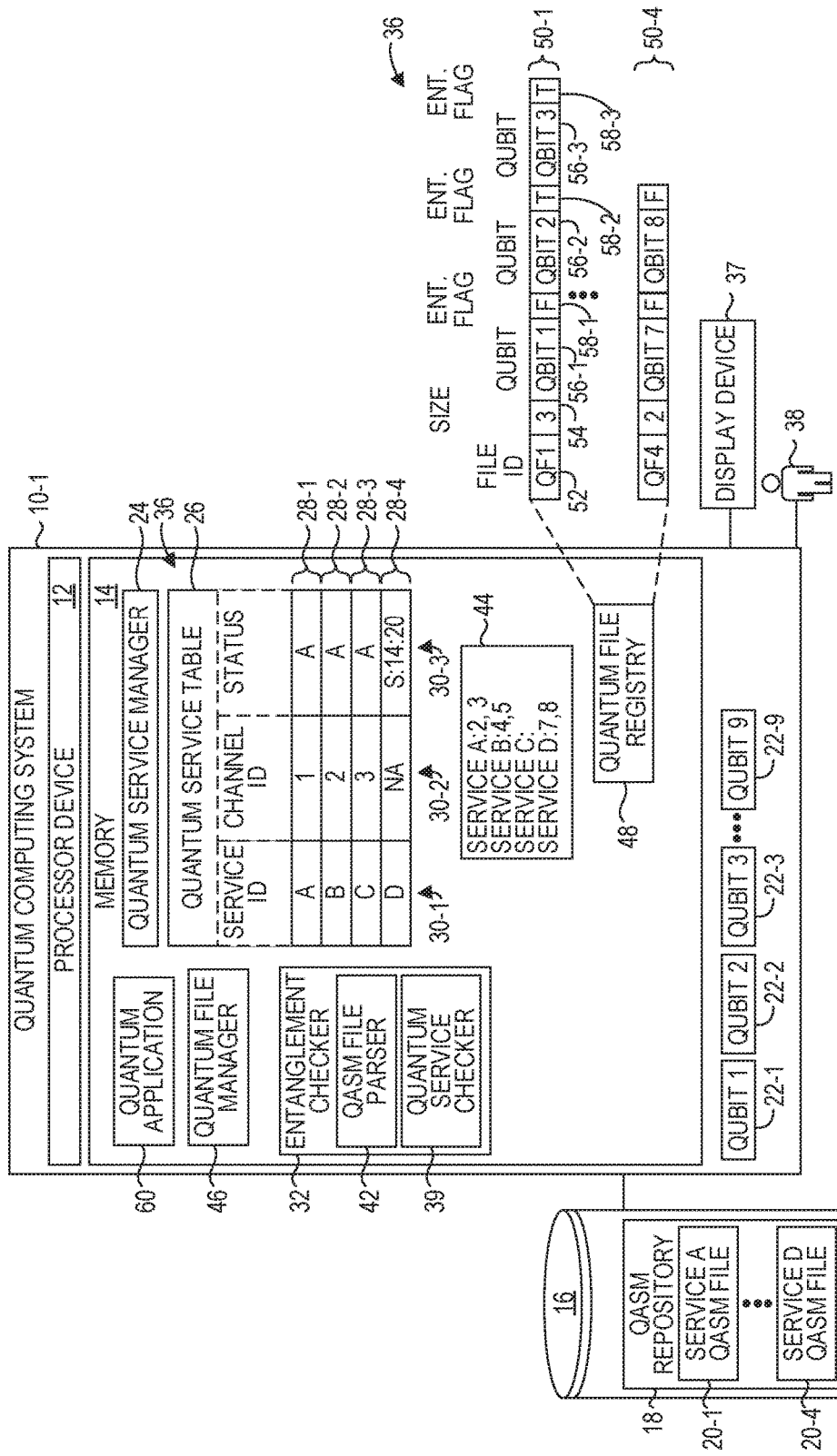
FIG. 3 is a block diagram of a quantum computing system in which additional examples may be practiced.

FIG. 3 is a block diagram of a quantum computing system 10-1 in which additional examples may be practiced. The quantum computing system 10-1 operates substantially similarly to the quantum computing system 10 discussed above with regard to FIGS. 1 and 2, except as otherwise noted herein. The quantum computing system 10-1 controls access to the qubits 22 via a quantum file structure that is controlled by a quantum file management system. The quantum file management system includes a quantum file manager 46 and a quantum file registry 48. The quantum file registry 48 includes metadata regarding quantum files implemented in the quantum computing system 10-1.

The quantum file registry 48 includes a plurality of quantum file records 50-1-50-4, each of which corresponds to a quantum file owned by the quantum computing system 10-1. Each respective quantum file record 50 includes metadata describing attributes of the respective quantum file that corresponds to the respective quantum file record 50. The quantum file record 50-1 defines a quantum file having an identifier of QF1. In this example, the QASM file 20-1 utilizes the quantum file record 50-1.

The quantum file record 50-1 includes an internal identifier field 52 that identifies the quantum file QF1. A size field 54 identifies the number of qubits that make up the quantum file QF1, and for each qubit of the number of qubits that make up the quantum file QF1, a qubit identification field and an entanglement status field. In this example, a qubit identification field 56-1 contains a qubit identifier that identifies the qubit 22-1; a qubit identification field 56-2 contains a qubit identifier that identifies the qubit 22-2; and a qubit identification field 56-3 contains a qubit identifier that identifies the qubit 22-3. Thus, the quantum file QF1 is made up of the qubits 22-1-22-3.

An entanglement field 58-1 indicates that the qubit 22-1 is not currently in an entangled state with any other qubit; an entanglement field 58-2 indicates that the qubit 22-2 is currently in an entangled state; and an entanglement field 58-3 indicates that the qubit 22-3 is currently in an entangled state. The entanglement fields 58-1-58-3 may be set from time to time by the entanglement checker 32, and thus may not always reflect the instantaneous realtime status of the corresponding qubits 22-1-22-3.

For purposes of illustration, assume that a quantum application 60 desires to access the quantum file QF1. The quantum application 60 interacts with the quantum file manager 46 and requests access to the quantum file QF1. Prior to allowing the quantum application 60 to access the quantum file QF1, the quantum file manager 46 sends a request to the entanglement checker 32, passing to the entanglement checker 32 the quantum file identifier QF1.

The entanglement checker 32 accesses the quantum file registry 48 to determine which qubits 22-1-22-9 compose the quantum file QF1. Based on the quantum file record 50-1, the entanglement checker 32 determines that the qubits 22-1-22-3 compose the quantum file QF1. In some implementations, the qubit entanglement information 36 includes the entanglement fields 58 of the quantum file records 50. Thus, the entanglement checker 32 may access the entanglement fields 58-1-58-3 and determine that the qubits 22-2 and 22-3 are in an entangled state. The entanglement checker 32 may then respond to the quantum file manager 46 with a response that indicates that at least one of the qubits 22-1-22-3 in the quantum file QF1 is in an entangled state, and thus the quantum file QF1 cannot be accessed at the current time. In some implementations, the entanglement checker 32 may respond with information that identifies the entanglement status of each of the qubits 22-1-22-3.

In some implementations, the entanglement checker 32 does not rely on the entanglement fields 58-1-58-3. The entanglement checker 32, after determining that the request from the quantum file manager 46 is associated with the qubits 22-1-22-3, may then access the quantum service metadata table 44 to determine which quantum service is capable of causing any of the qubits 22-1-22-3 to be in the entangled state. In some implementations, the entanglement checker 32 may parse the QASM files 20 to make this determination rather than accessing the quantum service metadata table 44, as discussed above with regard to FIG. 1.

The entanglement checker 32 determines, either by parsing and analyzing the QASM file 20-1, or via the quantum service metadata table 44, that the quantum service A causes the qubits 22-2-22-3 to be put into the entangled state. The entanglement checker 32 then accesses the quantum service table 26, and, via the information maintained in the row 28-1 of the quantum service table 26, determines that the quantum service A is active (i.e., executing). The entanglement checker 32 then sends a response to the quantum file manager 46 indicating that the qubits 22-2-22-3 are in the entangled state, and thus the quantum file QF1 is not available for access.

Figure 4:
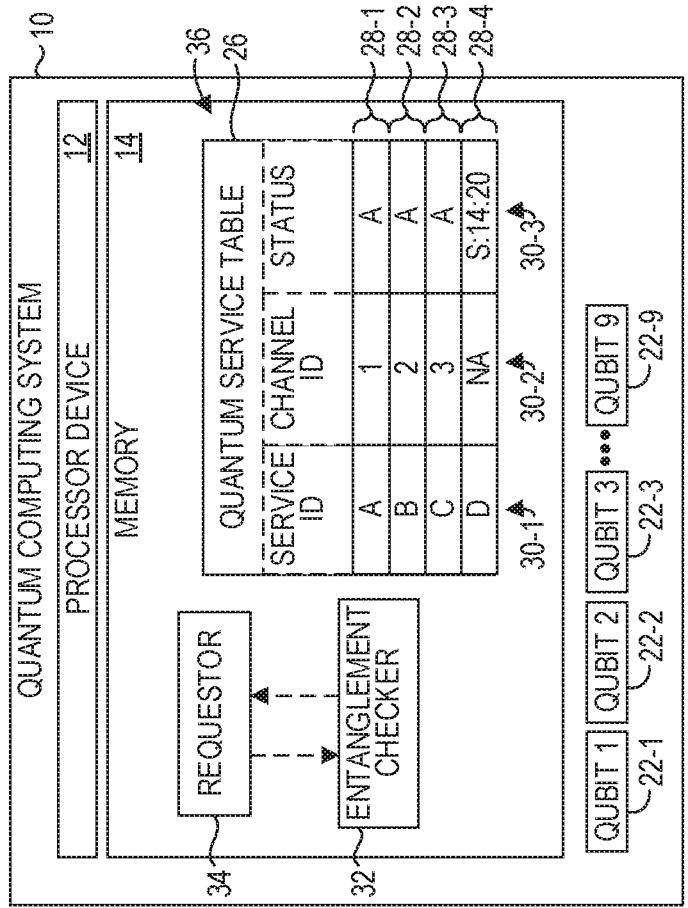
FIG. 4 is a block diagram of a simplified quantum computing system according to one implementation.

FIG. 4 is a block diagram of simplified quantum computing system 10 according to one implementation. The quantum computing system 10 includes the memory 14 and the processor device 12 coupled to the memory 14. The processor device 12 is to receive, by the entanglement checker 32, from the requestor 34, a request associated with a first qubit, such as the qubit 22-2. In response to receiving the request, the entanglement checker 32 accesses the qubit entanglement information 36, such as the quantum service table 26, that identifies an entanglement status of the qubit 22-2. The entanglement checker 32 determines, based on the qubit entanglement information 36, the entanglement status of the qubit 22-2. The entanglement checker 32 sends a response to the requestor 34 based on the entanglement status.

Figure 5:
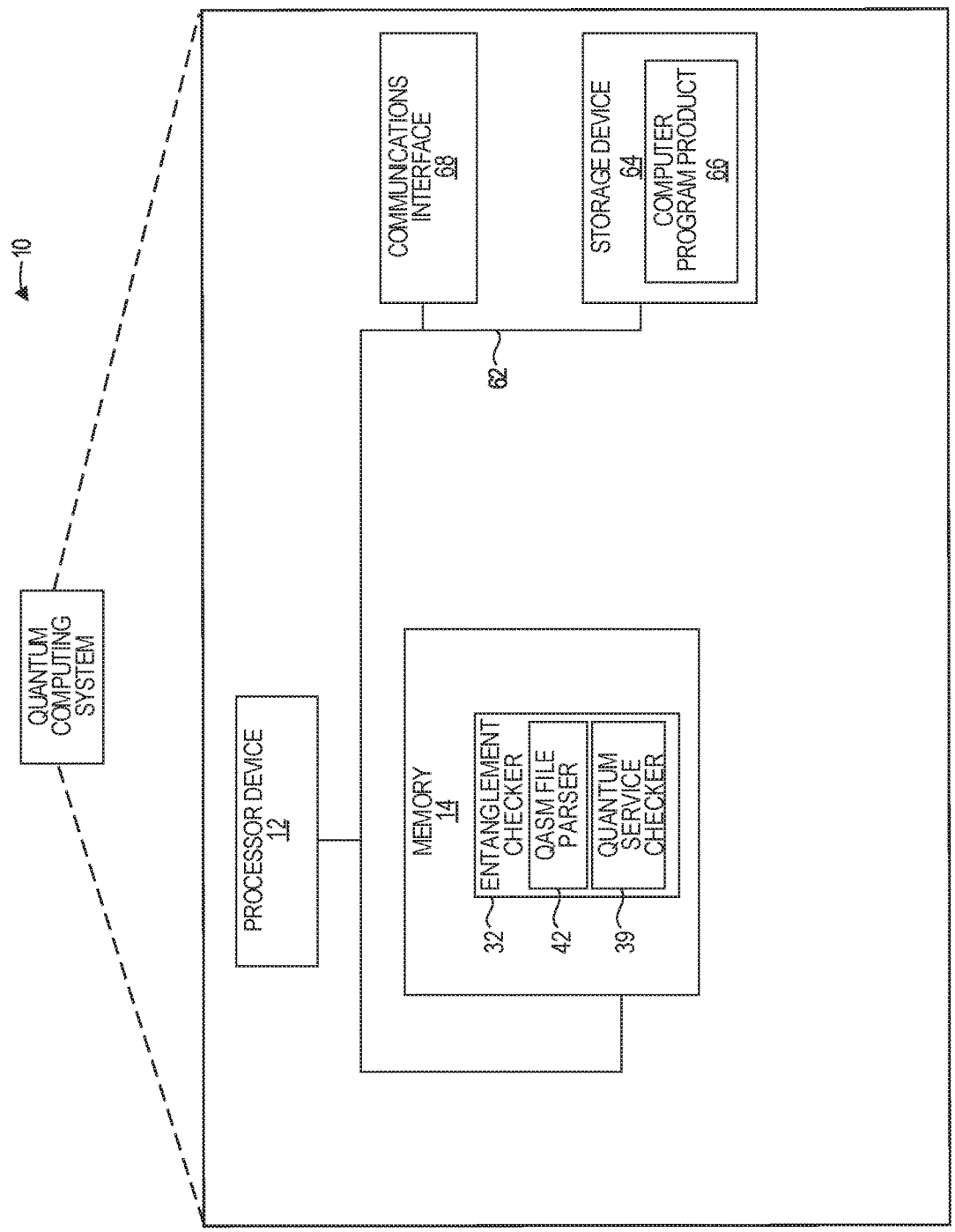
FIG. 5 is a block diagram of the quantum computing system illustrated in FIG. 1 according to another example.

FIG. 5 is a block diagram of the quantum computing system illustrated in FIG. 1 according to another example. The quantum computing system 10 may comprise any computing or electronic device capable of including firmware, hardware, and/or executing software instructions to implement the functionality described herein in a quantum environment. The quantum computing system 10 includes the one or more processor devices 12, the one or more memories 14 and a system bus 62. The system bus 62 provides an interface for system components including, but not limited to, the one or more memories 14 and the one or more processor devices 12. The processor devices 12 can be any commercially available or proprietary processor suitable for operating in a quantum environment. The quantum computing system 10 may further include or be coupled to a non-transitory computer-readable storage medium such as a storage device 64. The storage device 64 and other drives associated with computer-readable media and computer-usable media may provide non-volatile storage of data, data structures, computer-executable instructions, and the like.

A number of modules can be stored in the storage device 64 and in the memory 14, including the entanglement checker 32. All or a portion of the examples may be implemented as a computer program product 66 stored on a transitory or non-transitory computer-usable or computer-readable storage medium, such as the storage device 64, which includes complex programming instructions, such as complex computer-readable program code, to cause the one or more processor devices 12 to carry out the steps described herein. Thus, the computer-readable program code can comprise software instructions for implementing the functionality of the examples described herein when executed on the one or more processor devices 12.

An operator, such as the operator 38, may also be able to enter one or more configuration commands through a keyboard (not illustrated), a pointing device such as a mouse (not illustrated), or a touch-sensitive surface. The quantum computing system 10 may also include a communications interface 68 suitable for communicating with other computing devices, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:
 receiving, by an entanglement checker executing on a computing device comprising a processor device, from a requestor, a request associated with a first qubit;
 in response to receiving the request, accessing qubit entanglement information that identifies an entanglement status of the first qubit, the qubit entanglement information comprising data maintained outside of the first qubit, wherein the qubit entanglement information is based on contents of a quantum assembly language (QASM) file that corresponds to a quantum service currently utilizing the first qubit;
 determining, based on the qubit entanglement information, the entanglement status of the first qubit; and
 sending a response to the requestor based on the entanglement status.

2. The method of claim 1 further comprising:
 parsing the quantum assembly language (QASM) QASM file in accordance with a QASM programming language syntax; and
 identifying, in the QASM file, a QASM programming instruction that, if executed, causes the first qubit to enter an entangled state.

3. The method of claim 2 further comprising:
accessing, by the computing device, information that indicates that the quantum service implemented by the QASM file is currently executing; and
wherein the response to the requestor indicates the first qubit is not available for access.

4. The method of claim 2 further comprising:
accessing, by the computing device, information that indicates that a quantum service implemented by the QASM file is scheduled to be initiated at a particular time; and
wherein the response to the requestor indicates the first qubit is available for access until the particular time.

5. The method of claim 1 further comprising:
parsing a plurality of QASM files in accordance with a QASM programming language syntax;
identifying, in at least two QASM files of the plurality of QASM files, a QASM programming instruction that, if executed, causes the first qubit to enter an entangled state, each QASM file of the at least two QASM files corresponding to a different quantum service; and
accessing, by the computing device, information that indicates that at least one of the two different quantum services is currently executing.

6. The method of claim 1 wherein the request identifies the first qubit.

7. The method of claim 1 wherein the request identifies a quantum file comprising a plurality of qubits.

8. The method of claim 7 further comprising:
accessing quantum file information that identifies the first qubit as being one of the plurality of qubits that compose the quantum file;
determining, by the computing device, the QASM file that includes programming instructions for accessing the first qubit;
parsing the QASM file in accordance with a QASM programming language syntax; and
identifying, in the QASM file, a QASM programming instruction that, if executed, causes the first qubit to enter an entangled state.

9. The method of claim 8 further comprising:
accessing, by the computing device, information that indicates that the quantum service implemented by the QASM file is currently executing.

10. The method of claim 7 further comprising:
accessing quantum file information that identifies the plurality of qubits, including the first qubit, that compose the quantum file;
and further comprising:
determining, by the computing device, the QASM file that includes programming instructions for accessing the plurality of qubits;
parsing the QASM file in accordance with a QASM programming language syntax; and
identifying, in the QASM file, a QASM programming instruction that, if executed, causes at least one of the plurality of qubits to enter an entangled state.

11. The method of claim 10 further comprising:
accessing, by the computing device, information that indicates that the quantum service implemented by the QASM file is currently executing; and
wherein the response to the requestor indicates the quantum file is not available for access.

12. A quantum computing system, comprising:
a memory; and
a processor device coupled to the memory to:
receive, by an entanglement checker, from a requestor, a request associated with a first qubit;
in response to receiving the request, access qubit entanglement information that identifies an entanglement status of the first qubit, the qubit entanglement information comprising data maintained outside of the first qubit, wherein the qubit entanglement information is based on contents of a quantum assembly language (QASM) file that corresponds to a quantum service currently utilizing the first qubit;
determine, based on the qubit entanglement information, the entanglement status of the first qubit; and
send a response to the requestor based on the entanglement status.

13. The quantum computing system of claim 12 wherein the processor device is further to:
parse the quantum assembly language (QASM) QASM file in accordance with a QASM programming language syntax; and
identify, in the QASM file, a QASM programming instruction that, if executed, causes the first qubit to enter an entangled state.

14. The quantum computing system of claim 13 wherein the processor device is further to:
access information that indicates that the quantum service implemented by the QASM file is currently executing; and
wherein the response to the requestor indicates the first qubit is not available for access.

15. The quantum computing system of claim 12 wherein the request identifies a quantum file comprising a plurality of qubits.

16. The quantum computing system of claim 15 wherein the processor device is further to:
access quantum file information that identifies the first qubit as being one of a plurality of qubits that compose the quantum file;
determine the QASM file that includes programming instructions for accessing the first qubit;
parse the QASM file in accordance with a QASM programming language syntax; and
identify, in the QASM file, a QASM programming instruction that, if executed, causes the first qubit to enter an entangled state.

17. A computer program product stored on a non-transitory computer-readable storage medium and including instructions to cause a processor device to:
receive, by an entanglement checker executing on a quantum computing system, from a requestor, a request associated with a first qubit;
in response to receiving the request, access qubit entanglement information that identifies an entanglement status of the first qubit, the qubit entanglement information comprising data maintained outside of the first qubit, wherein the qubit entanglement information is based on contents of a quantum assembly language (QASM) file that corresponds to a quantum service currently utilizing the first qubit; and
determine, based on the qubit entanglement information, an entanglement status of the first qubit; and
send a response to the requestor based on the entanglement status.

18. The computer program product of claim 17 wherein the instructions further cause the processor device to:
 parse the quantum assembly language (QASM) QASM file in accordance with a QASM programming language syntax; and
 identify, in the QASM file, a QASM programming instruction that, if executed, causes the first qubit to enter an entangled state.

19. The computer program product of claim 18 wherein the instructions further cause the processor device to:
 access information that indicates that the quantum service implemented by the QASM file is currently executing; and
wherein the response to the requestor indicates the first qubit is not available for access.

20. The computer program product of claim 17 wherein the request identifies a quantum file comprising a plurality of qubits.

* * * * *